United States Patent [19]

Cunningham

[11] Patent Number: 4,991,053

[45] Date of Patent: Feb. 5, 1991

[54] SURGE ARRESTER WITH DRAINING INSULATIVE BRACKET

[75] Inventor: Francis V. Cunningham, Western Springs, Ill.

[73] Assignee: Joslyn Corporation, Chicago, Ill.

[21] Appl. No.: 384,276

[22] Filed: Jul. 24, 1989

[51] Int. Cl.[5] .......... H02H 9/00

[52] U.S. Cl. .......... 361/117; 361/126; 361/132; 174/158 R; 174/212

[58] Field of Search .......... 361/56, 58, 111, 117, 361/126, 127, 131, 132; 174/158 R, 166 R, 208, 211, 212

[56] References Cited

U.S. PATENT DOCUMENTS

| | | | |
|---|---|---|---|
| 3,586,758 | 6/1971 | Harmon et al. | 174/158 R |
| 4,125,742 | 11/1978 | Rabinowitz | 174/212 |

OTHER PUBLICATIONS

*Ohio Brass*, Catalog 94, DynaVan PDV-65 and PDV-100 Distribution Class Surge Arresters, 1988. Mounting Instructions, Ohio Brass PDV Arresters, 1988.

*Primary Examiner*—Todd E. Deboer
*Attorney, Agent, or Firm*—Mason, Kolehmainen, Rathburn & Wyss

[57] ABSTRACT

A surge arrester comprises a molded insulative support bracket for mounting the arrester to a metallic bracket. The insulative bracket includes at least two stringers that form at least one aperture between them. The aperture promotes the draining and drying of the insulative bracket. Baffles formed on the stringers increase the creepage distance across the insulative bracket and increase the rigidity and strength of the insulative bracket.

5 Claims, 3 Drawing Sheets

SURGE ARRESTER WITH DRAINING INSULATIVE BRACKET

FIELD OF THE INVENTION

This invention relates to high voltage surge arresters that include disconnectors, insulative mounting brackets, metal oxide varistors, and polymeric housings.

BACKGROUND OF THE INVENTION

In recent years, metal oxide surge arresters for protecting outdoor overhead high voltage electrical systems against lightning have been advantageously provided with polymeric weathershed housings, disconnectors, and with insulative brackets. Metal oxide varistor blocks are sealed within the polymeric housings, which protect and insulate the varistor blocks against the damaging effects of rain, snow and airborne contamination, for example. The insulative brackets have provided electrical insulation to allow for proper operation of the ground lead disconnector.

Prior art surge arresters have also included fiberglass tubes or wrappings supporting the varistor blocks. Also, the inner diameter, or bore, of the polymeric housings have been bonded to the outer peripheral surfaces of the tube or wrapping. U.S. Pat. Nos. 4,656,555 and 4,404,614 disclose some embodiments of these constructions and methods of construction. Methods of bonding a polymeric housing along its bore directly to varistor blocks, or to layers or coatings surrounding the blocks, are also disclosed in U.S. Pat. No. 4,161,012. Polymer housings molded directly onto the peripheral surfaces of an arrester element as well as to flat end surfaces are disclosed in U.S. Pat. No. 4,833,438. Each of the methods and embodiments referred to in the aforementioned U.S. patents involves a relatively expensive process for achieving a seal between the inner surfaces of an arrester housing and the outer or peripheral surfaces of arrester components enclosed within the housing.

A method of achieving an air free, sealed, moisture excluding interface between peripheral surfaces of arrester components and inner surfaces of an elastomeric housing that includes the use of silicone grease at the interface is also described with reference to FIG. 8 in U.S. Pat. No. 4,161,012. In a prior art embodiment using silicone grease at the above-described interface, the elastomeric or polymeric housing surrounding the arrester components has been also compressed between flat surfaces disposed at the opposing flat ends of the housing. However, in this embodiment, silicone oil from the silicone grease has escaped, along the flat surfaces, to outer surfaces of the housing. Here, the oil has accumulated objectionable quantities of airborne dust and dirt.

A surge arrester insulative bracket is shown in FIG. 3 of U.S. Pat. No. 4,609,902. Others are identified as the insulating base shown on pages 10 and 11 of Ohio Brass Catalog 94. The method of bolting the insulating base to a metallic arrester mounting bracket is shown in detail on Ohio Brass Instruction Sheet No. 17-5113, whereon the recommended mounting torque for the one-half inch fastener is forty ft-lbs. Torque greater than forty ft-lbs has cracked the insulating base in the area of the bold hole extending through the insulating base. Restricting the applied torque to forty ft-lbs places the burden of not cracking the insulating base, i.e., the insulative bracket, upon the skill, knowledge and diligence of the installer.

In the prior art devices, a lockwasher on a mounting bolt of the metallic bracket is compressed against a flat surface of an insulative bracket, the flat surface being perpendicular to the bolt hole extending through the bracket. The tightening of a threaded nut against the lockwasher transmits a mechanical force through the lockwasher to the flat surface. At a level of mechanical force predetermined by the characteristics of the insulative mass of material forming the insulative bracket, the flat surface yields and the insulative material under the lockwasher is crushed into the clearance that had surrounded the bolt in the bolt hole. Further tightening of the nut against the lockwasher then produces radial cracks extending from the damaged bolt hole through the insulative material, thereby weakening the bracket and drawing complaints from users.

Thus there is a need for an improved insulating base that can withstand greater torque during installation.

After a surge arrester has been bolted to a metallic mounting bracket, a threaded nut must be tightened against a clamp at the top end of the arrester to connect the arrester to an electrical power system. Similarly, a threaded nut at the bottom end of the arrester must be tightened to connect the ground lead disconnector of the arrester to a source of ground potential. During the tightening of either of these threaded nuts, there has been a tendency for the arrester housing, including the varistor blocks within the housing, to rotate with respect to the arrester insulative bracket thereby drawing complaints from users. Thus, there is a need to prevent such rotation.

In use, the metallic mounting bracket may also be connected to a source of ground potential.

With all connections made as described above, the full voltage of the power system exists across the arrester, from the top end of the arrester to the bottom end; and little voltage, if any, is impressed across the insulative bracket. However, the internal components of surge arresters have been known to become damaged, in which case the disconnector will automatically disconnect the ground wire from the arrester. Now the power line voltage may be impressed across the insulative bracket, as is known to those skilled in the art, until such time as the damaged arrester is discovered and replaced. Damaged arresters may not be discovered and replaced for hours, days, or even months, during which time the insulative bracket must withstand the voltage across it, without regard for weather conditions or atmosphere borne contaminants that may become deposited on the insulative bracket.

Under damp or rain conditions, the contaminants and moisture combine on the broad upper surfaces of prior art insulative brackets and conduct electrical leakage current across those upper surfaces as well as up and down the vertical surfaces of interposed baffles formed on the insulative brackets. Eventually, in the course of wetting and drying, the electrical current flowing across those surfaces, including the baffle surfaces, may damage the insulative bracket and/or cause it to fail to withstand the impressed voltage, thereby causing an outage of the electrical system. Baffles are known to be raised portions of insulative material disposed transversely to a leakage current path along an insulative bracket as a means to increase the length of the creepage distance, and thereby to decrease the magnitude of the leakage current.

SUMMARY OF THE INVENTION

An object of the present invention is to provide a surge arrester with an insulative bracket that includes means for reducing the accumulation of contaminants on the surfaces of the bracket.

Another object of the present invention is to provide a surge arrester with an insulative bracket that includes apertures for draining rain and airborne contaminants through the bracket to thereby reduce the flow of leakage current across the surfaces of the bracket.

Still another object of the present invention is to provide an improved insulative surge arrester bracket that is of lesser weight and lower in cost.

Yet another object of the present invention is to provide a surge arrester with an improved insulative bracket that will inhibit the accumulation of contaminants on its surfaces, and will readily drain and quickly dry.

Briefly, the device of the present invention is a surge arrester that includes an insulative bracket formed as a single elongated mass of insulative material. One end of the insulative bracket is rigidly connected to other components of the arrester. The other end of the insulative bracket provides for attachment of the arrester to a metallic mounting bracket. A supportive midportion of the insulative bracket rigidly interconnects the two end portions and includes one or more baffles. However, rather than using a conventional midportion of insulative material that supports the baffles and that is as wide as the end portions, the device of the present invention uses two relatively thin stringers for supporting the baffles and for rigidly interconnecting the end portions. Each of the stringers is less than one quarter as wide as the end portions.

BRIEF DESCRIPTION OF THE DRAWINGS

The above and other objects and advantages and novel features of the present invention will become apparent from the following detailed description of the embodiments of the invention illustrated in the accompanying drawings wherein.

DESCRIPTION OF THE PREFERRED EMBODIMENT

Figure 1:
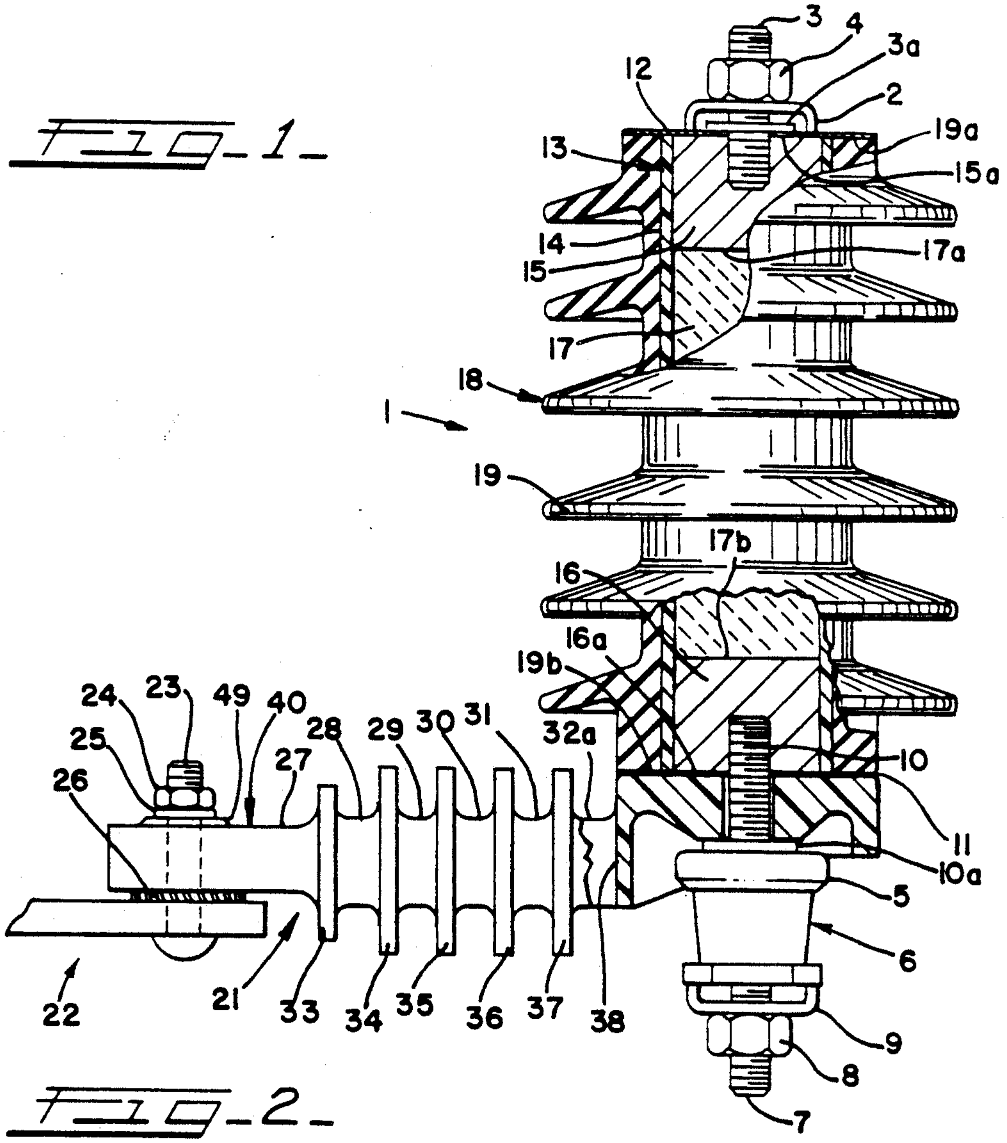
FIG. 1 is a side elevation, in partial section, of a preferred embodiment of a surge arrester constructed in accordance with the principles of the present invention, shown attached to a portion of a metallic mounting bracket.

FIG. 1 depicts a surge arrester 1 that includes a conventional clamping device 2 and threaded nut 4 for connecting the arrester 1 to an outdoor electric power distribution system. A ground lead disconnector 6 includes a clamping device 9 and threaded nut 8 for connecting a metallic wire to ground or earth. The body 18 of the arrester, the disconnector 6 and the insulative arrester bracket 21 are interconnected firmly together by means of a threaded conductive stud 10. The arrester 1 is shown mounted to a portion of a conventional metallic bracket 22 that includes a carriage bolt 23 that extends through the insulative bracket 21, a threaded nut 24, a helical spring lockwasher 25 and an external tooth lockwasher 26. When the surge arrester 1 is placed into service to protect an outdoor electric power distribution system, it is mounted firmly to the bracket 22 by the tightening of the nut 24. The metallic bracket 22 may be electrically grounded by conventional means, not shown; and a ground wire, not shown, will be connected in the clamp 9. One end of a conductive wire, not shown, will be connected in the clamp 2 and its other end to the high voltage wires of the electric power system.

The body 18 of the arrester 1 includes an arrester element 13 enclosed within a polymeric weathershed housing 19. Arrester element 13 includes metallic spacers 15, 16 and metal oxide varistor element 17, which may consist of one or more varistor blocks disposed between and in electrical series contact with the metallic spacers 15, 16. The flat series contact surfaces, e.g., 17*a* and 17*b*, as well as similar flat series contact surfaces that may exist between varistor blocks forming varistor element 17, may be bonded together by soldering or by the use of a conductive cement, such as a mixture of silver and epoxy, as is known in the art. The arrester element 13 may also include a relatively rigid insulative tube or wrapping 14, firmly attached to the spacers 15, 16 and retaining the spacers 15, 16 and the varistor element 17 together in series electrical contact.

The spacers 15, 16 are centrally threaded to receive and engage the threads of the threaded studs 3, 10, which pass through central holes of the metallic discs 11, 12.

During assembly of the arrester 1, a first layer of adhesive, not shown, is placed between the metallic disc 12 and the adjacent flat end surfaces, namely, 19*a* of the housing 19 and 15*a* of the spacer 15. Similarly, a second layer of adhesive is placed between the metallic disc 11 and the end surface 19*b* of the housing 19 and of the end surface 16*a* of the spacer 16. A third layer of adhesive is placed between the disc 11 and the adjacent flat surface of the insulative bracket 21. The task of applying the adhesive is relatively simple, since all of the surfaces to which the adhesive is to be applied are end surfaces, fully exposed prior to assembly of the surfaces together. The adhesive may be PLIOBOND #20, made by the Goodyear Tire & Rubber Co., or another suitable adhesive.

The polymeric housing 19 may also be elastomeric, made of EPDM rubber, for example. It is made longer in length than is the arrester element 13, by a predetermined amount; just as it is in prior art arresters where silicone grease has been used to maintain an atmosphere excluding interface at the end surfaces of an elastomeric housing as well as along the entire internal bore of the housing. However, adhesive need not be applied to the bore of the housing 19, nor along the peripheral surface of the arrester element 13, but merely at the end surfaces referred to above. Whether the adhesive is applied as a wafer cut to the shape of the opposing ends to be bonded, or is spread or painted on, or is applied as a continuous bead or line, it is advantageous that the elastomeric housing be as long, and preferably longer, than the arrester element. Compression of the elastomeric housing then assures that the adhesive will then bond to the entire end surface of the housing and to the opposing flat surface to be bonded. PLIOBOND #20 is readily applied as a continuous bead which spreads to fully cover the housing end when compressed, and it cures at room temperature, though elevated temperature may be used. For wafers, elevated temperatures are usually required.

It is to be understood that any of the opposing flat surfaces that are to be bonded need only be substantially flat; this is, adequately flat so that the compression of the housing 19 will cause its end surfaces **19*a*, 19*b*** to adequately conform to an opposing substantially flat surface to form a moisture excluding seal when bonded. As such, either or both of the opposing flat surfaces to be bonded may include concentric annular grooves or bosses and still be considered as being substantially flat.

Thus, when the adhesive has been appropriately applied in a manner as described above, and when the threaded stud 3, which includes a central flange portion **3*a*, and the threaded stud 10, which includes an end flange 10*a*, are screwed into the spacers 15, 16, the flange 3*a* will bear against the disc 12, which, in turn, through the adhesive, will bear against the housing end surface 19*a* and finally against the adjacent end surface 15*a* of the spacer 15. Similarly the flange 10*a* will bear against the adjacent portion of the insulative bracket 21, and the insulative bracket 21 will in turn, through the adhesive, bear against the disc 11, which in turn, through the adhesive, will bear against the housing end surface 19*b* and against the adjacent end surface 16*a* of the spacer 16. When the threaded studs 3, 10 have been fully tightened, the housing 19 will be compressed to the same length as the arrester element 13. The force then exerted by the housing 19 will assure that the adhesive at the end surfaces 19*a* and 19*b* has been spread into a thin continuous layer, and that the adhesive layer will not be disturbed during the time required for the adhesive to set up and bond the housing surfaces 19*a*, 19*b* to the respective discs 11 and 12. When all three layers of adhesive have set up to bond their respective surfaces, the arrester body 18 will be permanently sealed against the ingress of moisture and permanently bonded to the insulative bracket 21. Thus, when torque is applied to the nuts 4, 8, to connect the arrester 1 to a high voltage electrical system and to a ground wire, respectively, the torque thereby transmitted will not cause the arrester body 18 to be rotated with respect to the insulative bracket 21, as may occur when the body 18 is not bonded or otherwise locked to the insulative bracket 21**.

In another embodiment, the arrester 1 of FIG. 1 may be assembled without inclusion of the metallic disc 11. In this instance, the third layer of adhesive would also be deleted, the second layer of adhesive therefore bonding the housing end surface **19*b*, and the end surface 16*a* of the spacer 16, directly to the adjacent surface of the insulative bracket 21**.

When the arrester 1 is electrically connected in service, the disc 12, electrically connected to the clamp 2, is energized at high voltage. The disc 11, in contact with the threaded stud 10 and metallic cup or cap 5, are all at near ground or earth potential, as is the conductive metallic bracket 22. Therefore, little or no voltage is impressed across or along the insulative arrester bracket 21, between the disc 11 and the metallic bracket 22. It is well known and understood that varistor block or blocks 17 within the arrester body 18 may eventually become damaged, causing the disconnector 6 to automatically separate the clamp 9, and the attached ground wire, from the arrester 1, thereby causing the metal disc 11, together with the metallic cap 5 to which the flange **10*a* is firmly attached, to become energized at high voltage. The disc 11 may remain energized at high voltage until the damaged arrester 1 is replaced, or until the insulative bracket 21 itself is unable to withstand the high voltage, flashes over electrically from the energized disc 11 to the grounded metallic bracket 22**, and causes an outage of the electrical system.

When the interconnected spacer 16, the disc 11 the stud 10 and the cap 5 are energized at high voltage, the amount or magnitude of the leakage current flowing along the creepage distance surfaces, e.g., the horizontal surfaces **27–32*a*, added together with the horizontal and vertical surfaces of the baffles 33–38 of the insulative bracket 21**, will depend on the amount of the moisture and contaminants deposited on those surfaces. In general, leakage current increases with increased moisture and contaminants, e.g., rain water, dust, dirt, salts, etc., and electrical flashover is more likely to occur with increased leakage current.

Figure 2:
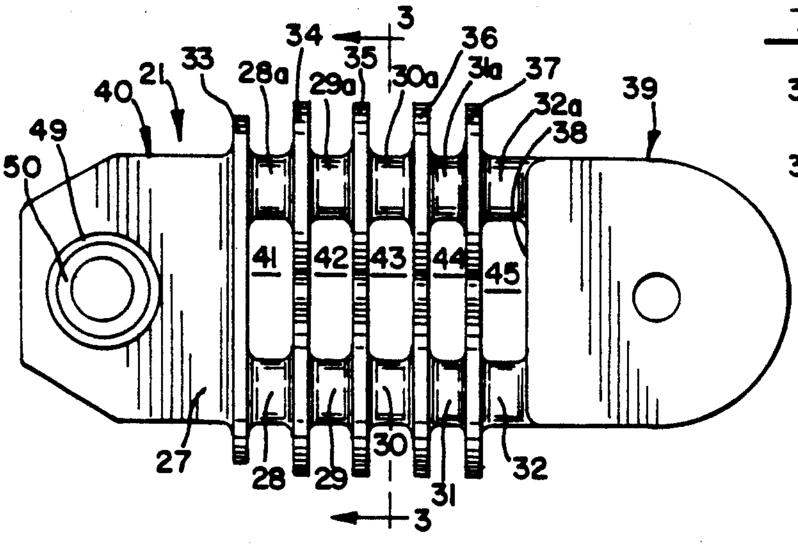
FIG. 2 is a top plan view of the insulative bracket shown assembled in the surge arrester depicted in FIG. 1.
Figure 3:
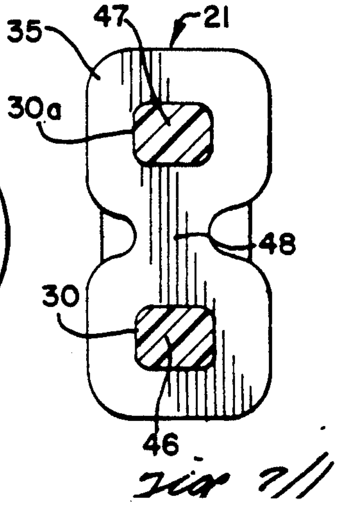
FIG. 3 is a cross-sectional view of the device of FIG. 2 taken along the line 3—3 of FIG. 2.

The manner in which the insulative bracket 21 has been improved to reduce its weight and cost and to reduce the amount of moisture or liquid and contaminants deposited along its creepage path or leakage distance is best explained with respect to FIGS. 2 and 3.

In FIGS. 1–7, the same numbers have been used to identify the same portions of the insulative bracket 21 and of the metallic bracket 22.

FIG. 2 illustrates a preferred embodiment of the present invention, wherein a mass of insulative material has been molded to form insulative bracket 21 which includes end portions 39, 40 and baffles 33–38. Also included are the horizontal surfaces 28–32 and **28*a*–32*a*, each of which is less than one quarter as wide as the end portions 39, 40, since their width is interrupted by the width of the included apertures 41–45**.

The apertures 41–45 reduce the mass of the insulative material required to form the insulative bracket 21, thereby reducing the weight and cost of bracket 21. Further, liquids, including rain; and contaminants such as airborne dirt; can readily drain or fall entirely through the apertures 41–45, thus reducing the amount of liquid, moisture or contaminants that will remain on the insulative bracket 21. As a consequence, the creepage path can dry quickly, leakage current flow through the moisture and contaminants is reduced; and the probability that the bracket 21 will flashover and cause an electrical outage is reduced.

FIG. 3 depicts the baffle 35 that is also typical of the baffles 33, 34, 36 and 37, all of which have been necked down at their centers to even further reduce the amount and cost of the mass of insulative material used to form the insulative bracket 21. The surfaces 30, **30*a* are the top surfaces of the stringers 46, 47 that may be construed as extending from and between the end portions 39, 40. The stringers 46, 47, the baffles 33–38 and the end portions 39, 40** are all rigidly interconnected as one single mass of molded insulative material, a fiberglass reinforced polyester, for example.

In FIG. 3, the baffle 35 may also be construed as having been formed of three parts, i.e., one baffle formed around stringer 46, a second baffle formed around stringer 47, and with the two separate baffles being aligned for interconnection by the necked down portion 48 of baffle 35, thereby forming the single baffle 35. This construction increases the rigidity and strength of the insulative bracket 21, particularly with all baffles 33–37 being formed in this manner as single baffles, each enclosing both stringers 46, 47.

As shown in FIG. 1, when the nut 24 has been tightened on the bolt 23 to compress the helical spring lockwasher 25 as shown, the lockwasher 25 restrains the nut from vibrating loose while the teeth of the external tooth lockwasher 26 bite into the adjacent surfaces of the metallic bracket 22 and the insulative bracket 21 to prevent rotation of the bracket 21 around the bolt 23. The configuration and function of the convexity 49 are hereinunder explained with reference to FIG. 7.

Figure 4:
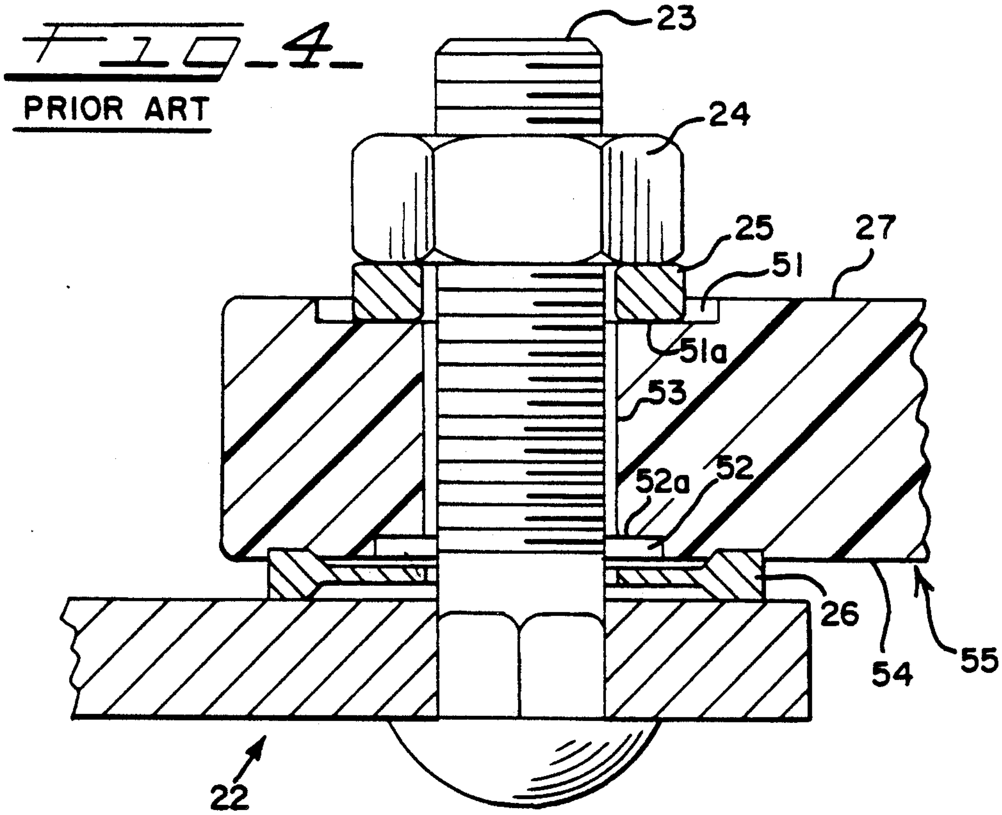
FIG. 4 PRIOR ART
FIG. 4 is a side elevation in partial section, of an end portion of a prior art insulative arrester bracket shown bolted to a metallic mounting bracket.

FIG. 4 is a detailed enlargement of the portion of the prior art insulating base or bracket depicted on the aforementioned Ohio Brass Instruction Sheet No. 17-5113, whereon the recommended tightening torque for nut 24 is shown as 40 ft-lbs.

The concavities 51, 52 of FIG. 4 are shown, without written description, on the aforementioned Sheet No. 17-5113. Each concavity 51, 52 defines a flat surface 51*a*, 52*a* at opposing ends of bolt hole 53. On FIG. 4, lockwasher 24 is shown fully compressed against the flat surface 51*a*. The teeth of lockwasher 26 are shown at least partially embedded or biting into the surface 54 of the partially shown insulative bracket 55, as it might be with 40 ft-lbs of torque applied to the nut 24.

Figure 5:
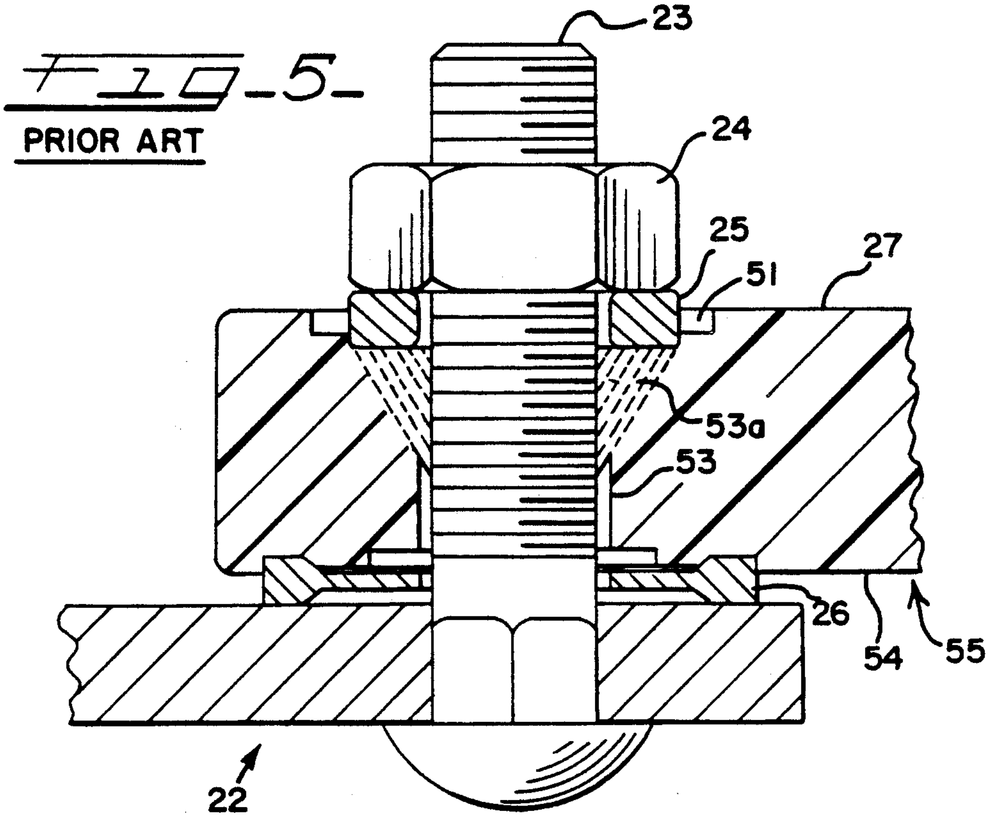
FIG. 5 PRIOR ART
FIG. 5 is a side elevation, in partial section, of an end portion of a prior art insulative arrester bracket shown damaged by assembly to a metallic mounting bracket.

FIG. 5 is the same as FIG. 4 except that the nut 24 has been tightened beyond 40 ft-lbs to further embed the teeth of lockwasher 26 into the surface 54, and the insulative material forming the bracket 55 has been cracked, crushed and displaced into the upper portion of the bolt hole 53 and into the threads of the bolt 23, as depicted by the dashed lines at 53*a*. When the nut 24 is then further tightened, the wedgelike form of the crushed material 53*a* can cause radial cracks to then form and extend through the insulative material from the bolt hole 53. This weakens the bracket and renders it nonreusable, since any attempt to remove the bracket 55 from the bolt 23 requires the removal of the crushed material 53*a* that extends into the threads of the bolt 23. The full embedment of the teeth of the lockwasher 26 tends to exacerbate the cracking, as evidenced by cracks that have been found extending in line with the teeth of the lockwasher 26.

Figure 6:
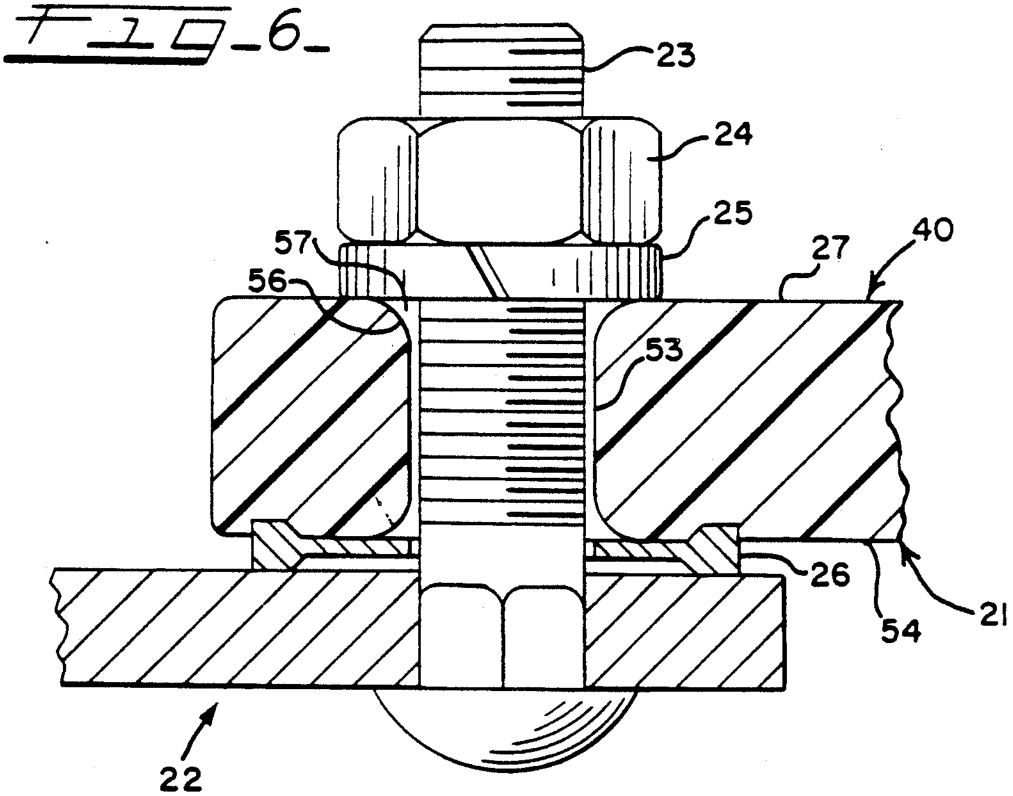
FIG. 6 is a side elevation, in cross-section, of a portion of an insulative bracket in accordance with an embodiment of the invention, shown attached to a portion of a metallic mounting bracket.

FIG. 6 depicts the portion 40 of insulative bracket 21 shown in FIGS. 1 and 2, except that the convexity 49 together with the concavity 50 have been deleted. Instead, in accordance with another embodiment of the invention, a radiused surface 56 joins the flat surface 27 and the bore surface 53 to form the concavity 57. The concavity 57 causes the washer 25, when compressed against the insulative bracket 21 by the tightening of threaded nut 24, to contact the insulative bracket 21 only at contact surfaces that are nearest or adjacent the outer diameter of the washer 25. As a result, the crushing of the insulative material surrounding the bolt hole 53, as explained hereinabove with respect to FIG. 5, has been alleviated, and greater torque may be applied to the nut 24 before crushing or cracking of the insulative material surrounding the bolt hole 53 may occur.

Figure 7:
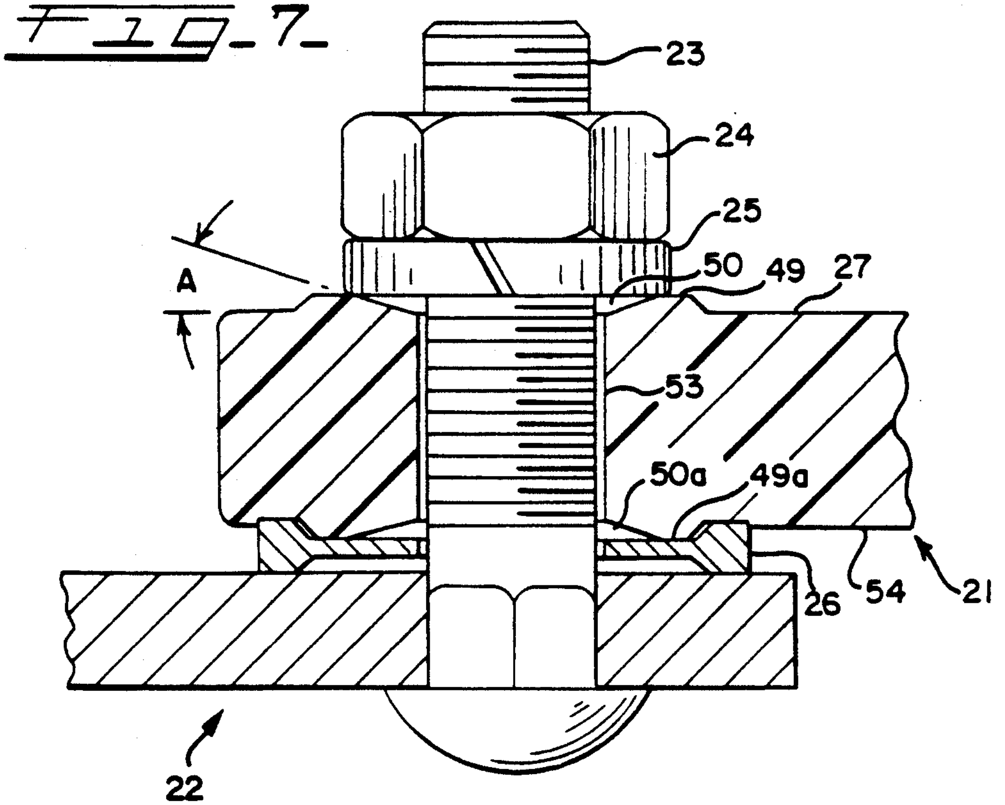
FIG. 7 is a side elevation, in cross-section, of the portion of the insulative bracket that is shown in FIG. 1 assembled to a metallic mounting bracket.

While the concavity 57 alleviates the cracking of the insulative bracket 21 that is due to compressing of the washer 25 against the bracket 21, the cracking due to penetration of the surface 54 by the teeth of the lockwasher 26 is not alleviated. Such alleviation is achieved by the preferred embodiment of the invention as depicted in FIG. 1, and in greater detail in FIG. 7. Here the insulative bracket 21 includes annular convexities or bosses 49, 49*a* that define annular concavities 50, 50*a* formed as a countersink at the predetermined angle A. The convexities 49, 49*a* and the defined or surrounded concavities 50, 50*a* are formed substantially concentrically to bolt hole 53. The height of the convexities 49, 49*a* have been chosen so as to limit the penetration of the teeth of the lockwasher 26 into the surface 54 to approximately one-half of the penetration that can occur against the flat surface 54 as shown in FIG. 5. Any further penetration of the teeth of washer 26 into the surfce 54, FIG. 7, is prevented when the central flat portion of the metallic lockwasher 26 impacts the convexity 49*a* as the nut 24 is tightened.

Because of large variations in the actual configurations of washers, i.e., lockwasher 25, due to material thicknesses, forming methods, and corrosion protective coatings of washers, a chamfer angle A of 4 to 8 decrees has been found to be most advantageous.

The provision of convexities 49, 49*a* so as to form concavities 50, 50*a* has been found to raise the resistance to the cracking of insulative surge arrester brackets, the cracking being due to the compression of a flat washer or a helical spring washer against one side of an insulative bracket as well as that due to the compression of an external tooth lockwasher against an opposing side.

While certain advantageous embodiments have been chosen to illustrate the invention, it will be understood by those skilled in the art that any embodiment that includes an annular convexity or concavity or spacing means substantially concentric to a bolt hole through an arrester insulative bracket is considered to be within the teachings of the invention if it causes an insulative bracket to contact a washer surface at surfaces substantially adjacent the outer diameter of that washer surface rather than at surfaces substantially adjacent the inner diameter of that washer surface, when that washer surface is being compressed against the insulative bracket by the tightening of a threaded means. When the tightening has been properly completed, it is to be understood that the insulative material forming the bracket and the washer surface itself, may have been mechanically deformed during the tightening, without deleterious effect, so that contact between the washer surface and the bracket may then also exist at the surfaces substantially adjacent the inner diameter of the washer surface.

Obviously, many modifications and variations of the present invention are possible in light of the above teachings. Thus, it is to be understood, that, within the scope of the appended claims, the invention may be practiced otherwise than as specifically described above.

What is claimed and desired to be secured by Letters Patent is:

1. A molded insulative bracket for a surge arrester formed of insulative material comprising first and second end portions and a midportion extending between said first and second end portions, said midportion including at least two spaced apart rigid stringers extending from said first end portion to said second end portion and a plurality of apertures formed between said first and second spaced apart stringers for draining liquid through said midportion.

2. The molded insulative bracket for a surge arrester as defined in claim 1 including a plurality of baffles disposed about said first and second stringers for increasing the electrical creepage distance along said stringers and between said first and second end portions, one of said apertures being disposed between each pair of adjacent baffles.

3. An insulative bracket for a surge arrester comprising first and second end portions and a midportion interconnecting said first and second end portions, said midportion having opposed support means extending between said first and second end portions and at least two baffles disposed on said midportion between said first and second end portions and draining means for draining liquid through said midportion, said draining means comprising at least one aperture disposed between said opposed support means and extending entirely through said midportion transversely to the longitudinal axis of said bracket between said first and second end portions, said aperture being disposed between said two baffles.

4. In combination with a surge arrester for protecting a high voltage electrical power system comprising a polymeric weathershed housing having a bore, said housing being adapted to be mounted in a generally vertical orientation, and an arrester element disposed within said bore, an elongated insulative bracket having an elongated axis extending between first and second end portions and a midportion having first and second spaced apart support means for interconnecting said first and second end portions, said first end portion of said insulative bracket being attached to said arrester element such that said elongated axis of said bracket extends in a generally horizontal orientation and said midportion of said insulative bracket including draining means for draining liquid through said midportion, said draining means being disposed between said first and second support means and extending through said midportion transversely to said longitudinal axis of said bracket.

5. The bracket as defined in claim 4 including a plurality of baffle means disposed about said midportion and said draining means being disposed between each adjacent pair of said baffle means.

* * * * *

UNITED STATES PATENT AND TRADEMARK OFFICE

CERTIFICATE OF CORRECTION

PATENT NO. : 4,991,053

DATED : February 5, 1991

INVENTOR(S) : Francis V. Cunningham

It is certified that error appears in the above-identified patent and that said Letters Patent is hereby corrected as shown below:

Column 1, line 66 "bold" should read --bolt--.

Signed and Sealed this

Second Day of June, 1992

*Attest:*

DOUGLAS B. COMER

*Attesting Officer*

*Acting Commissioner of Patents and Trademarks*